United States Patent
Garnier et al.

(10) Patent No.: US 12,473,230 B2
(45) Date of Patent: Nov. 18, 2025

(54) GLASS-FIBRE TEXTILE STRUCTURE WITH PARYLENE COATING

(71) Applicant: SAINT-GOBAIN ADFORS, Courbevoie (FR)

(72) Inventors: Louis Garnier, Paris (FR); Jonas Bouchard, Paris (FR); Eric Mattmann, Paris (FR); Camila Garces, Brookline, MA (US)

(73) Assignee: SAINT-GOBAIN ADFORS, Courbevoie (FR)

( * ) Notice: Subject to any disclaimer, the term of this patent is extended or adjusted under 35 U.S.C. 154(b) by 730 days.

(21) Appl. No.: 17/785,994

(22) PCT Filed: Dec. 14, 2020

(86) PCT No.: PCT/FR2020/052411
§ 371 (c)(1),
(2) Date: Jun. 16, 2022

(87) PCT Pub. No.: WO2021/123583
PCT Pub. Date: Jun. 24, 2021

(65) Prior Publication Data
US 2023/0032170 A1    Feb. 2, 2023

(30) Foreign Application Priority Data

Dec. 16, 2019 (FR) ...................................... 1914450

(51) Int. Cl.
| | |
|---|---|
| *C04B 28/02* | (2006.01) |
| *C03C 25/1025* | (2018.01) |
| *C03C 25/1095* | (2018.01) |
| *C03C 25/32* | (2018.01) |
| *C09D 165/04* | (2006.01) |
| *C04B 111/26* | (2006.01) |

(52) U.S. Cl.
CPC ............ *C03C 25/32* (2013.01); *C03C 25/103* (2013.01); *C03C 25/1095* (2013.01); *C04B 28/02* (2013.01); *C09D 165/04* (2013.01); *C04B 2111/26* (2013.01); *C08G 2261/3424* (2013.01)

(58) Field of Classification Search
CPC ... C03C 25/32; C03C 25/103; C03C 25/1095; C04B 28/02; C04B 28/06; C04B 28/065; C04B 28/08; C04B 28/10; C04B 28/14; C04B 28/04; C04B 2111/26; C09D 165/04
USPC .......................................................... 523/209
See application file for complete search history.

(56) References Cited

U.S. PATENT DOCUMENTS

| | | | |
|---|---|---|---|
| 4,278,623 A * | 7/1981 | Niegisch | A61L 33/0094 264/28 |
| 4,961,994 A | 10/1990 | Cariou et al. | |
| 2010/0137491 A1* | 6/2010 | Rose | C08K 3/26 524/424 |
| 2011/0000606 A1* | 1/2011 | Al-Emrani | E04C 5/085 156/60 |
| 2016/0115300 A1 | 4/2016 | Le Corvec et al. | |

OTHER PUBLICATIONS

International Search Report issued Mar. 9, 2021 in PCT/FR2020/052411 (with English translation), 5 pages.

* cited by examiner

*Primary Examiner* — Hannah J Pak
(74) *Attorney, Agent, or Firm* — Element IP, PLC

(57) ABSTRACT

The invention relates to a glass-fiber textile structure, characterized in that it has a parylene (poly(para-xylylene)) coating with a thickness of between 5 μm and 30 μm, preferably between 6 μm and 25 μm, in particular between 7 and 20 μm. The invention also relates to a method for reinforcing a solid material, which comprises introducing such a textile structure having a parylene coating into a fluid base material, preferably a base material comprising water and a hydraulic binder, and curing the base material.

15 Claims, No Drawings

GLASS-FIBRE TEXTILE STRUCTURE WITH PARYLENE COATING

The invention relates to a glass-fiber textile structure whose surface is covered with a parylene coating several microns thick and to the use of such a textile structure to reinforce materials, preferably materials with an alkaline hydraulic binder.

The textiles used to reinforce hydraulic binder-based materials, in particular with a base of plaster or cementitious materials such as mortars or concretes, generally have a base of organic polymers, steel or glass fibers.

Steel is the oldest and most widespread reinforcing material. It allows very significant reinforcing, in particular for structural applications (see for example U.S. Pat. No. 3,120, 257 or WO 95/13440).

Polymers are generally used in the form of dispersed short fibers or in the form of a textile impregnated with a resin (see for example WO 2017/117045).

Glass fibers are used in particular to reinforce cementitious materials, in particular facade mortars in external thermal insulation composite systems (ETICS), to manufacture cement plates or to reinforce prefabricated concrete. Glass fibers are generally used in the form of non-woven webs bound by an organic binder or in the form of grids.

Glass fibers have the advantage, relative to steel, of being lighter and more flexible, therefore easier to wind, transport and handle, and of better withstanding acid corrosion.

When one wishes to use glass fibers in alkaline materials such as cements, mortars and concretes, it is necessary to use alkaline-resistant glass fibers (AR glass), which is significantly more expensive than ordinary glass (E or C glass).

It is known to protect reinforcing fibers made from ordinary E or C glass using organic coatings with a base of thermoplastic or thermoset polymers, in particular with a base of SBR (styrene-butadiene rubber) elastomer, styrene-acrylic latex, acrylic latex or with a base of PVC, but the protection conferred by these polymers is generally not fully effective and durable and requires perfect continuity of the coating, which is difficult to obtain. These flaws and imperfections limit the use of glass fibers in demanding applications. Alkali-resistant protective layers with a base of organic polymers for example have the drawback of considerably increasing the cost of glass-fiber-based reinforcing products and degrading their fire resistance.

The present invention is based on the idea of protecting glass-fiber textile reinforcements with a particular type of organic polymer that is not deposited by the liquid route, but by a method that resembles chemical vapor deposition. This deposition method allows excellent coverage of textile structures, down to the smallest details. The deposited layers perfectly marry the surface relief and as a result provide better protection for the underlying glass than the usual polymer depositions.

The organic polymer used in the present invention is parylene, in particular parylene C, a polymer known per se but which, to the knowledge of the inventors, has never been used for the chemical protection of glass fibers against alkaline environments. This polymer can be deposited directly on the glass fibers, sized or not, and optionally covered, in locations, with organic binder, for example in the case of non-woven mats of glass fibers.

The protection by the parylene layer may of course be reinforced by depositing other organic layers, for example by polymers, in particular elastomers, deposited on or under the parylene layer.

The first object of the present application is therefore a glass-fiber textile structure bearing a parylene (poly(para-xylylene)) coating having a thickness of between 5 μm and 30 μm.

It further relates to a method for reinforcing a solid material, said method comprising introducing such a textile structure bearing a parylene coating into a fluid base material and curing the base material.

Lastly, the present application relates to a reinforced solid product or a reinforced solid material comprising a solid base material (matrix) and such a textile structure bearing a parylene coating, incorporated into the solid base material.

In the present application, the term "textile structure" refers to a set of textile glass fibers. The textile glass fibers, also called glass filaments or monofilaments, may simply be gathered into rovings or into multifilament yarns. These rovings or yarns may in turn be assembled into more complex structures by weaving, knitting or needling or by gluing, for example using a binder. The textile structures of the present invention thus encompass rovings and multifilament yarns, non-woven, needled or bonded mats or webs, cloths (closed woven textiles), grids (open woven or knit textiles), or non-woven products often referred to as laid scrims and which have grid structures formed from layers of superimposed yarns in at least two different directions.

The textile structures of the present invention are preferably chosen from the group consisting of multifilament yarns, rovings, non-woven mats bonded by an organic binder, cloths, woven grids, knit grids and laid scrims. Of course, the textile structures also encompass combinations of two or more than two elements from this list, for example a laminate of a woven or knit grid and a non-woven mat.

When the textile structures are non-woven mats, the textile glass fibers are preferably bonded using an organic binder with a thermoset polymer base. Examples of thermoset polymer binders are those obtained from a melamine-formaldehyde, urea-formaldehyde or phenol-formaldehyde resin or a mixture of these resins.

The parylene coating preferably has a thickness of between 6 μm and 25 μm, in particular between 7 and 20 μm.

It is deposited in a known manner using a gaseous phase method called "Gorham method" after its inventor (Gorham W. F., 1966 "A New, General Synthetic Method for the Preparation of Linear Poly(p-xylylene)," *J. Polym. Sci.* Part A-1 Vol. 4, p. 3027-3039). The deposition method comprises sublimating the ([2,2]paracyclophane, optionally chlorinated) solid dimer precursor of formula

[Formula 1]

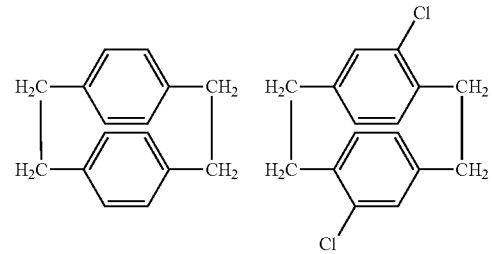

-continued

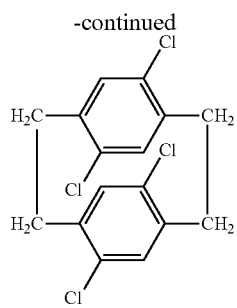

by heating to a temperature above 100° C., pyrolyzing the gaseous dimer at a temperature of between about 500° C. and 700° C., resulting in the formation of a reactive monomer, and depositing the reactive monomer on the object to be coated, kept under vacuum (about 0.1 torr) and generally at ambient temperature.

This deposition may be done on the constituents of the textile structure (monofilaments, rovings, yarns) or on the textile structure produced from the monofilaments, rovings or yarns.

Thus, in a textile structure of the woven grid type, the coating may individually cover each of the yarns of the grid and, as a result, be present at the points of contact of the yarns. Or it may be applied on the textile structure in its final form and cover the surface thereof without being present at the points of contact between the yarns or filaments.

In order to form an effective anti-alkali barrier, the parylene coating preferably completely covers the entire surface of the textile structure so as to isolate the textile structure from the atmosphere.

The glass fibers of the textile structure of the present invention may in principle be formed from any type of glass, for example A, E, C, T or AR glass.

In one preferred embodiment, the glass fibers are made from E, A or C glasses. These are less expensive glasses that, due to their significant alkaline sensitivity, benefit most from the chemical barrier function of the parylene coating. E glass is of particular interest because it is particularly inexpensive, but sensitive to alkalines.

When the textile structure is formed from glass fibers kept together or coated by a binder (for example non-woven mat, cloth, woven or knit grid, laid scrim), the glass fibers advantageously represent from 30 to 95%, preferably from 35 to 90% by weight, and in particular from 40 to 85%, of the weight of the textile structure before deposition of the parylene coating. The additional portion to reach 100% is for example formed by the organic binder or by fibers different from glass fibers, for example carbon fibers, natural fibers or metallic fibers.

When the textile structure is formed by unbonded glass fibers or glass fibers coated by an organic binder (rovings, spun yarns), the glass fibers generally represent from 98 to 100% of the weight of the textile structure before deposition of the parylene coating.

The total surface mass of the textile structure covered by the parylene coating is advantageously between 30 and 600, preferably between 40 and 500, in particular between 50 and 400.

The parylene coating advantageously represents from 5 to 200%, preferably from 8 to 160%, better still from 10 to 150%, relative to the weight of the textile structure before deposition of the parylene coating.

The parylene used to form the anti-alkaline protective coating is preferably parylene C (poly(2-chloro-paraxylylene)).

In a known manner, parylene C has a lower gas permeability and a better acid resistance than parylene N (non-chlorinated) and forms a film with a better mechanical strength and a better wear resistance. Furthermore, the deposition performance of parylene C is higher than that of parylene N.

The textile structure of the present invention bearing the parylene coating may further be coated with an organic polymer coating. Such coatings are generally formed by elastomers, typically styrene-butadiene rubber, styrene acrylic, acrylic or PVC. This additional coating reinforces the alkaline resistance of the textile structures of the present invention. In the case of laid scrims, it further ensures the cohesion of the structure formed by layers of superimposed yarns.

The textile structures of the present invention may be used as mechanical reinforcements for solid materials. Their good alkali resistance makes them particularly appropriate for reinforcing hydraulic binder-based materials. "Hydraulic binder" refers to a mineral material that, when mixed with water, forms a liquid or paste that cures by reaction of the binder with the water.

The hydraulic binders are in particular chosen from the group consisting of Portland cement, lime, high alumina cements, slag cements, sulfo-aluminous cements and alkaline-activated cements, or plaster.

The method for reinforcing a solid material of the present invention comprises introducing a textile structure bearing a parylene coating as described above into a fluid base material and curing the base material.

The base material preferably comprises water and a hydraulic binder. It advantageously has a basic pH greater than 8, preferably greater than 9, in particular greater than 10.

The reinforced solid product or material obtained by the above method comprises a solid base material and a textile structure bearing a parylene coating, embedded in the solid base material.

Examples of solid products or materials reinforced by the textile structures of the present invention include the facade mortars of exterior insulation systems (EIS), screeds, cement plates, concretes, prefabricated elements made from cement or concrete, and grouts.

EXAMPLE 1

A coating of parylene C with uniform thickness of about 10 μm is deposited on a non-woven mat of E glass fibers having a grammage of 50 g/m², the fibers of which are bonded with 25% of an organic binder having a base of urea-formaldehyde resin.

The non-woven mat next undergoes an aging test in an alkaline environment as defined in ETAG 004 (Technical guide for external facade insulation systems), which takes place as follows:

20 rectangular specimens are cut with dimensions of 300 mm×50 mm from the non-woven mat bearing the parylene coating. For half of the samples, the length (300 mm) is parallel to the machine direction; for the other half of the samples, the length is perpendicular to the machine direction.

All 20 samples are submerged for 28 days, at a temperature of 23° C., in 4 liters of an alkaline solution having the following composition: 1 g/l of NaOH, 4 g/l of KOH, 0.5 g/l Ca(OH)$_2$.

After 28 days submerged, the samples are rinsed for 5 minutes in an acid solution (5 mL of HCl diluted at 35%), then successively placed for 5 minutes in 3 water baths of 4 liters each.

The samples are next dried for 48 hours at a temperature of 23° C. (±2° C.) and a relative humidity of 50% (±5%).

The mechanical resistance to traction is next determined using a MTS Insider bench operating with a traction speed of 100 mm/minute.

Table 1 shows the breaking strength in traction (BST expressed in N/5 cm) of the samples cut parallel to the machine direction and perpendicular to the machine direction, before and after exposure to the aging test, compared with samples of an identical non-woven mat having undergone the same treatment, but not having been coated beforehand with parylene. The values shown in the table are the averages (±standard deviation) calculated from 10 samples.

TABLE 1

|  |  | With parylene | Without parylene |
|---|---|---|---|
| Traction in the direction parallel to the machine direction of the non-woven mat | BST before aging | 341 ± 62 | 243 ± 14 |
|  | BST after aging | 266 ± 19 | 57 ± 10 |
|  | BST conservation rate | 77% | 23% |
| Traction in the direction perpendicular to the machine direction of the non-woven mat | BST before aging | 239 ± 86 | 155 ± 61 |
|  | BST after aging | 206 ± 21 | 66 ± 33 |
|  | BST conservation rate | 86% | 43% |

One can see that the aging of the non-woven mats, after exposure to alkaline conditions, is significantly slowed by the presence of the parylene coating.

EXAMPLE 2

A layer of parylene 10 µm thick is deposited on a spun yarn of E glass having a count of 68 tex before deposition and of 100 tex after deposition of the parylene.

Ten samples of this yarn are subjected to the "Strain in Cement" test described in standard EN14649:2005 (Precast concrete products—test method for strength retention of glass fibers in cement and concrete (SIC-TEST)).

Table 2 below shows the evolution of the tenacity (expressed in cN/tex) and the modulus of elasticity (expressed in GPa) of the yarn coated with parylene during the test, compared with the same yarn not coated with parylene (68 tex).

TABLE 2

|  | Yarn with parylene | Yarn without parylene |
|---|---|---|
| Count (tex) | 100 | 68 |
| Initial tenacity (cN/tex) | 56.2± | 87.1± |
| Final tenacity (cN/tex) | 22.8± | 3.2± |
| Tenacity conservation rate | 40.5% | 3.7% |
| Initial modulus of elasticity (GPa) | 44.7 ± 6.3 | 59.2 ± 2.7 |
| Final modulus of elasticity (GPa) | 40.1 ± 1.7 | 12.8 ± 6.8 |
| Modulus of elasticity conservation rate | 89.7% | 21.6% |

Depositing a parylene protective layer allows nearly 90% of the modulus of elasticity to be retained, versus only 21% for the control yarn with no parylene deposit. The same is true for the tenacity, which is significantly less degraded in the presence of parylene compared to the absence thereof.

The layer of parylene C coating the reinforcing yarns made from E glass thus constitutes effective protection of the glass yarns from chemical attacks by the alkaline components of the cementitious material.

The invention claimed is:

1. A method for reinforcing a solid material, the method comprising:
   introducing a textile structure made of glass fibers and bearing a parylene (poly(para-xylylene)) coating having a thickness of between 5 µm and 30 µm into a fluid base material comprising water and a hydraulic binder and having a basic pH greater than 8; and
   curing the fluid base material.

2. The method according to claim 1, wherein the glass fibers are A, E or C glass fibers.

3. The method according to claim 1, wherein the textile structure is made of glass fibers held together or coated by a binder, and
   wherein the glass fibers represent from 30 to 95% of the weight of the textile structure before deposition of the parylene coating.

4. The method according to claim 1, wherein the parylene is parylene C (poly(2-chloro-paraxylylene)).

5. The method according to claim 1, wherein the parylene coating represents from 5 to 200% relative to the weight of the textile structure before deposition of the parylene coating.

6. The method according to claim 1, wherein the parylene coating completely covers the entire surface of the textile structure so as to isolate the textile structure from the atmosphere.

7. The method according to claim 1 wherein the fluid base material has a basic pH greater than 10.

8. The method according to claim 1, wherein the parylene (poly(para-xylylene)) coating has a thickness of between 6 µm and 25 µm.

9. The method according to claim 1, wherein the parylene (poly(para-xylylene)) coating has a thickness of between 7 µm and 20 µm.

10. The method according to claim 1, wherein the glass fibers are E glass fibers.

11. The method according to claim 1, wherein the textile structure is made of glass fibers held together or coated by a binder, and wherein the glass fibers represent from 40 to 85% of the weight of the textile structure before deposition of the parylene coating.

12. The method according to claim 11, wherein the parylene is parylene C (poly(2-chloro-paraxylylene)).

13. The method according to claim 1, wherein the parylene coating represents from 8 to 160% relative to the weight of the textile structure before deposition of the parylene coating.

14. The method according to claim 1, wherein the textile structure is selected from the group consisting of multifilament yarns, rovings, non-woven mats bonded by an organic binder, cloths, woven grids, knit grids, and laid scrims.

15. The method according to claim 1, wherein the fluid base material has a basic pH greater than 9.

* * * * *